United States Patent [19]
Furuse

[11] Patent Number: 5,671,565
[45] Date of Patent: Sep. 30, 1997

[54] STRUCTURE AND METHOD OF FITTING DOOR MOLDINGS

[75] Inventor: Yoshinobu Furuse, Saitama-ken, Japan

[73] Assignee: Honda Giken Kogyo Kabushiki Kaisha, Tokyo, Japan

[21] Appl. No.: 577,400

[22] Filed: Dec. 22, 1995

[30] Foreign Application Priority Data

Dec. 26, 1994 [JP] Japan ................................ 6-323295

[51] Int. Cl.⁶ ............................................ B60J 1/16
[52] U.S. Cl. ................................... 49/377; 49/475.1
[58] Field of Search ........................ 49/374, 377, 475.1, 49/495.1

[56] References Cited

U.S. PATENT DOCUMENTS 5,067,281  11/1991  Dupuy ................................. 49/377 X
5,170,586  12/1992  Ose et al. ............................ 49/377
5,261,188  11/1993  Vaughan .............................. 49/377

FOREIGN PATENT DOCUMENTS 20515  2/1983  Japan ................................... 49/377

*Primary Examiner*—Blair Johnson
*Assistant Examiner*—Jerrt Redman
*Attorney, Agent, or Firm*—Armstrong, Westerman, Hattori, McLeland & Naughton

[57] ABSTRACT

The present invention is constructed so that, in a structure for fitting a door molding which is provided for covering a gap between a door outer panel and a window glass, the door molding is fitted on an upper portion of the door outer panel by a thermosetting structural adhesive material. The door molding can be simply fitted on the door outer panel only by heating the thermosetting structural adhesive material. Moreover, after fitting, a firm fitting state can be maintained by the thermosetting structural adhesive material.

15 Claims, 5 Drawing Sheets

STRUCTURE AND METHOD OF FITTING DOOR MOLDINGS

FIELD OF THE INVENTION

This invention relates to an improvement in a door molding for covering a gap between the window glass and the door outer panel of a vehicular door and, more particularly, to a door-molding fitting structure and method wherein a door molding is simply and firmly fitted on the door outer panel.

BACKGROUND OF THE INVENTION

Conventional door moldings for covering a gap between the upper portion of the window glass and the door outer panel of a vehicular door are shown in FIGS. 4 and 5.

FIG. 4 is a cross sectional view of a conventional door-molding fitting structure. A vehicular door 101 is comprised of a door outer panel 102 facing the outside of the vehicular body, a door inner panel 103 facing the indoor side, and a window glass 104. On the upper portion of the door outer panel 102, there is fitted a door molding 106 for covering the gap between the door outer panel 102 and the window glass 104.

The upper end portion of the door outer panel 102 has a horizontal portion 102a extending toward the indoor side and a rise portion 102b rising from an indoor side end of the horizontal portion 102a. On the upper indoor side of the door outer panel 102, there is provided a stiffener 105 for stiffening the door outer panel 102. The upper end of this stiffener 105 is firmly bonded to the rise portion 102b.

The door molding 106 consists of a clip 107 and a molding 108 fitted to the clip 107. The clip 107 has an elastic hanger 107a formed on upper side thereof and an elastic arm 107b formed on lower side thereof.

The clip 107 is simply fitted on the upper portion of the door outer panel 102 by inserting the lower portion of the clip 107 into an insertion hole 105a of the stiffener 105, clamping the rise portion 102b with the upper elastic hanger 107a, and pressing the proximal portion of the rise portion 102b with the lower elastic arm 107b.

FIG. 5 is a cross sectional view of another conventional door-molding fitting structure. The same reference numerals will be applied to the same constructions or members as FIG. 4 and therefore a description thereof will not be given.

The upper portion of a door outer panel 102 has a horizontal portion 102a extending toward the indoor side and a fall portion 102c falling from an indoor side end of the horizontal portion 102a, and is provided with a stiffener. An insertion hole 102d is formed in the corner portion between the horizontal portion 102a and the fall portion 102c.

A door molding 116 consists of a clip 117 and a molding 118 fitted to the clip 117. The clip 117 has a lower elastic hanger 117a and an elastic arm 117b.

The clip 117 is simply fitted on the upper portion of the door outer panel 102 by inserting the lower portion of the clip 117 into the insertion hole 102d, clamping the lower end portion of the fall portion 102c of the door outer panel 102 with the elastic hanger 117a, and pressing the upper margin portion of the insertion hole 102d with the elastic arm 117b.

In order to prevent rainwater or dust particles from getting into the interior of the door, it is preferable that the contact state between the window glass 104 and the molding 108, 118 be proper at all times. For this reason, the door moldings 106 and 116 are required to be firmly fitted on the door outer panel 102.

However, because in the prior art shown in FIG. 4 the door molding 106 is fixed to the door outer panel 102 with an elastic force, holding the fitting state between the door outer panel 102 and the door molding 106 firmly is not easy in the case where an external force F, indicated by an arrow, acts on the door molding 106.

Even in the prior art shown in FIG. 5, as with the prior art shown in FIG. 4, the door molding 116 is fixed to the door outer panel 102 with an elastic force, and consequently, holding the fitting state between the door outer panel 102 and the door molding 116 firmly is not easy in the case where an external force, indicated by an arrow F, acts on the door molding 116.

Accordingly, the important objective of the present invention is to provide a door-molding fitting structure and a door-molding fitting method where a door molding can be simply and firmly fitted on a door outer panel.

SUMMARY OF THE INVENTION

The above object is achieved, in a structure for fitting a door molding which is provided for covering a gap between a window glass and a door outer panel, by fitting the door molding on an upper portion of the door outer panel by means of a thermosetting structural adhesive material.

The upper portion of the door outer panel is constructed so as to have a horizontal portion extending toward an indoor side and a fall portion falling from an indoor side end of the horizontal portion, and the thermosetting structural adhesive material is fitted on the horizontal portion and the fall portion.

The thermosetting structural adhesive material comprises a thermosetting structural adhesive material in the form of a tape.

It is preferable that the thermosetting structural adhesive material comprise a structural adhesive agent having a thermosetting property or a semi-structural adhesive agent having a thermosetting property.

The foregoing object can also be achieved by providing a method of fitting a door molding which comprises the steps of: (1) adhering one surface of a thermosetting structural adhesive material to a contact surface portion of a clip having a zigzag-shaped section; (2) adhering the other surface of the thermosetting structural adhesive material to an upper portion of the door outer panel after an undercoating process of the coating of a vehicular door is completed; (3) in an intermediate coating process and a finish coating process of the coating of the vehicular door, setting the thermosetting structural adhesive material by heat that is given in performing a dry process of the coating in a baking and dry furnace; and (4) holding lower and outer ends of the door molding on lower and upper portions of the clip by means of snap fitting.

Thus, the door molding can be simply fitted on the door outer panel by heating the thermosetting structural adhesive material after the door molding is fitted on the door outer panel by means of the thermosetting structural adhesive material. Moreover, after fitting, the thermosetting structural adhesive material is set and the door molding and the door outer panel are firmly bonded together, and consequently, the firm fitting state can be maintained.

Because the door molding is fitted on the two surfaces of the horizontal and fall portions of the door outer panel, a more firm fitting state can be maintained.

BRIEF DESCRIPTION OF THE DRAWINGS

The present invention will be described in further detail with reference to the accompanying drawings, in which.

DETAILED DESCRIPTION OF THE INVENTION

Figure 1:
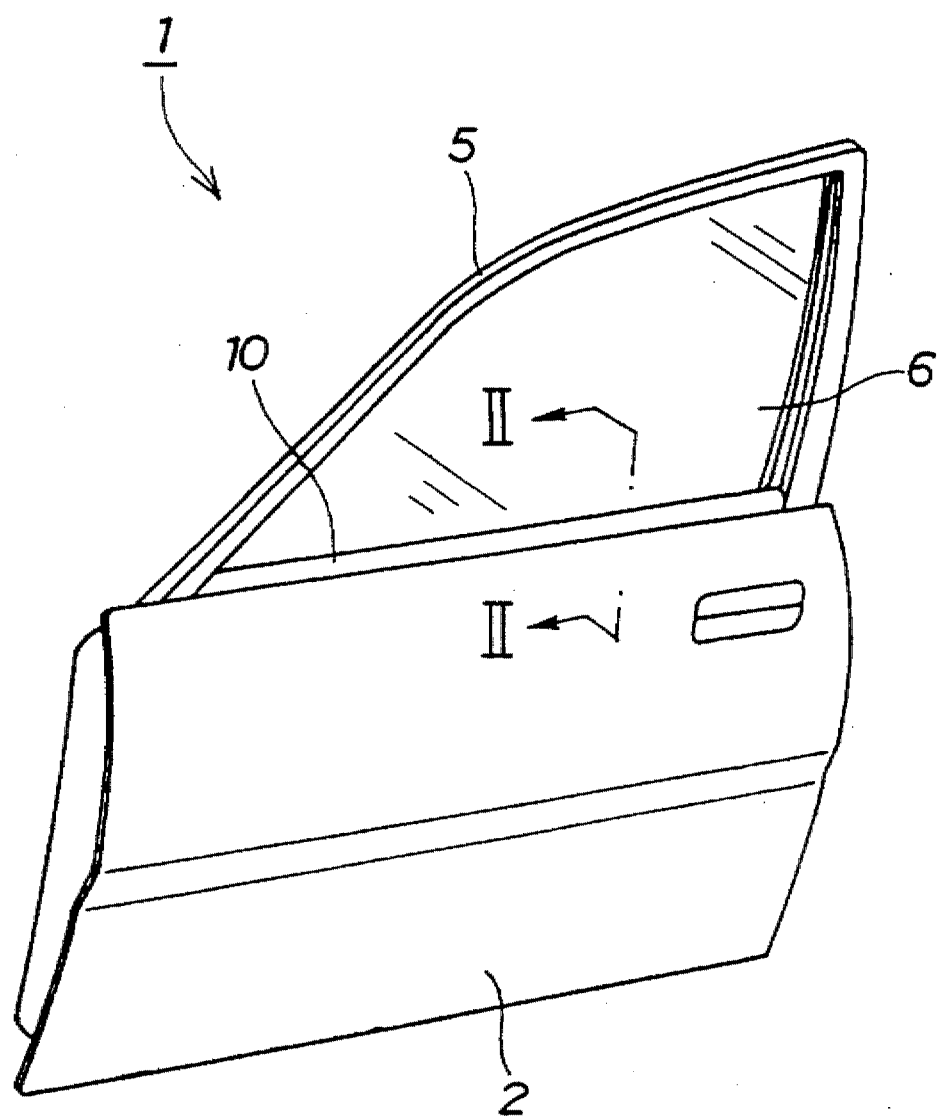
FIG. 1 is a perspective view showing a vehicular door according to the present invention.

Referring to FIG. 1, a vehicular door 1 comprises a door panel 2, a door sash 5 provided on the upper side of the door panel 2, and a window glass 6 which rises and falls from the door panel 2. A long strip of door molding 10 is fitted on the upper end portion of the door panel 2.

Figure 2:
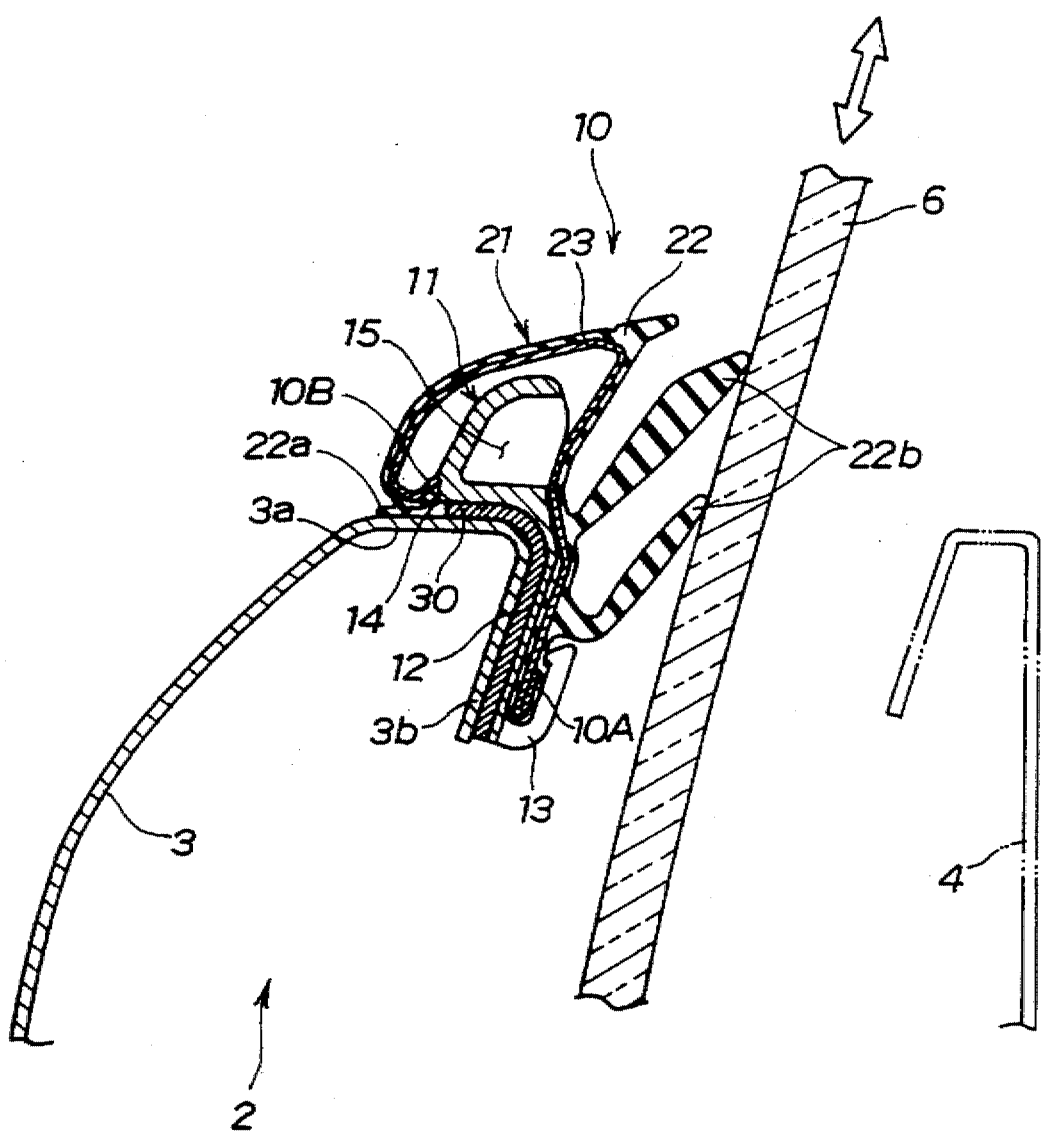
FIG. 2 is an enlarged cross sectional view of the door-molding fitting structure in FIG. 1 taken substantially along line II—II of FIG. 1.

In FIG. 2, the door panel 2 consists of a door outer panel 3 facing the outside of the vehicular body and a door inner panel 4 facing the indoor side. On the upper end portion of the door outer panel 3, there is fitted the door molding 10 for covering the gap between the door outer panel 3 and the window glass 6.

The upper end portion of the door outer panel 3 has a horizontal portion 3a extending toward the indoor side and a fall portion 3b falling from an indoor side end of the horizontal portion 3a, and is provided with a stiffener for stiffening the door outer panel 3.

On the other hand, the door molding 10 consists of a clip 11 and a molding 21 fitted to this clip 11.

The clip 11 is made, for example, of rigid resin and presents a generally zigzag-shaped section (continuous shape of L and inverted L). This clip 11 has a contact surface portion 12 formed along the section shapes of the horizontal portion 3a and the fall portion 3b of the door outer panel 3, a lower hook 13 rising from the lower end of the contact surface portion 12 in facing relationship with the indoor side, and an upper hook 14 rising from an outer end of the contact surface portion 12, and they are integrally formed. The lower hook 13 forms one of a plurality of lower hooks intermittently provided at predetermined intervals in the longitudinal direction of the clip 11 (direction perpendicular to the plane of FIG. 2), and the lower hooks have elasticity. Reference numeral 15 denotes a rib for reinforcement.

The molding 21 is formed so as to enclose the upper side and the indoor side of the clip 11. The molding 21 consists of a molding member 22 and a core member 23 for reinforcing the molding member 22. The molding member 22 and the core member 23 are, for example, integrally formed. The lower end 10A of the door molding 10 is elastically held in the lower hook 13 of the clip 11. The outer end 10B of the door molding 10 is elastically held to the upper hook 14 of the clip 11.

The molding member 22 has an outer lip 22a which is pressed against the horizontal portion 3a of the door outer panel 3 to seal the horizontal portion 3a and inner lips 22b which are pressed against the window glass 6 to seal the window glass 6.

On the upper end portion (horizontal portion 3a and fall portion 3b) of the door outer panel 3, the contact surface portion 12 of the clip 11 is fitted by a thermosetting structural tape 30 serving as a thermosetting structural adhesive material.

The thermosetting structural tape 30 temporarily bonds the door outer panel 3 and clip 11 together and is set by heat (furnace temperature) which is given in performing the baking process of the coating of the vehicular body (including the vehicular door 1), thereby firmly bonding the door outer panel 3 and the clip 11 together.

Now, a description will be made of the details of the thermosetting structural adhesive material.

Initially, a description of an adhesive agent will be made. Although there are various kinds of methods of classifying adhesive agents, the adhesive agents will be classified according to adhesive strengths. According to the classification by adhesive strength, adhesive agents are classified into a structural adhesive agent, a semi-structural adhesive agent, and a non-structural adhesive agent depending on the adhesive strength.

The structural adhesive agent is, according to an explanation of the term "adhesive agent" of International Organization for Standardization (ISO), an adhesive agent with high reliability where a stress relatively near to a maximum rupture stress can be applied without rupture for a long period of time. Stating the outline of the structural adhesive agent, in a narrow sense the structural adhesive agent presents a high tensile stress (high modulus of rupture) even at a high temperature and can stand a large load over a long period of time, and in a broad sense the structural adhesive agent presents a high adhesive strength in the operational temperature range of the application and purpose where an object to be given an adhesive agent is actually used. For this kind of structural adhesive agent, phenol resin, epoxy resin, unsaturated polyester resin, polyimide resin, and polybenzimidazole resin can be used as thermosetting resin.

The non-structural adhesive resin is used in the case of adhesion of a non-structure where, unlike the structural adhesive agent, a high tensile stress (high modulus of rupture) is not required at high temperature. In general, the non-structural adhesive resin has the property that, as temperature rises, creep occurs in an adhesive layer and an adhesive strength rapidly decreases and, conversely, as temperature falls, rigidity becomes high and fragility appears.

The structural adhesive resin has an intermediate property between the structural adhesive agent and the non-structural adhesive agent and can stand a certain degree of load. For this kind of semi-structural adhesive agent, phenol resin, resorcinol resin, urea resin, epoxy resin, diethyl acrylate resin, and silicone resin can be used as thermosetting resin.

The thermosetting structural adhesive material, which is used in this embodiment, is the aforementioned structural adhesive agent having a thermosetting property or the semi-structural adhesive agent having a thermosetting property, and comprises, for example, a thermosetting structural adhesive material 30 formed into a tape shape. While the thermosetting structural tape 30 will be described as an example of the thermosetting structural adhesive material which is used in this embodiment, the present invention is not limited to the tape 30.

Used as the thermosetting structural tape 30 is, for example, a semi-structural acrylic foam tape (tape product number 4775 or 4778) commercially available from SUMITOMO-3M. The semi-structural acrylic form tape has a thickness of 1.0 to 1.6 mm where thermosetting acrylic foams are used as a base material and a thermosetting acrylic adhesive material is used as an adhesive agent. The tape has a high adhesive strength when heat setting is performed for 20 min. at 140° C.

Figure 3:
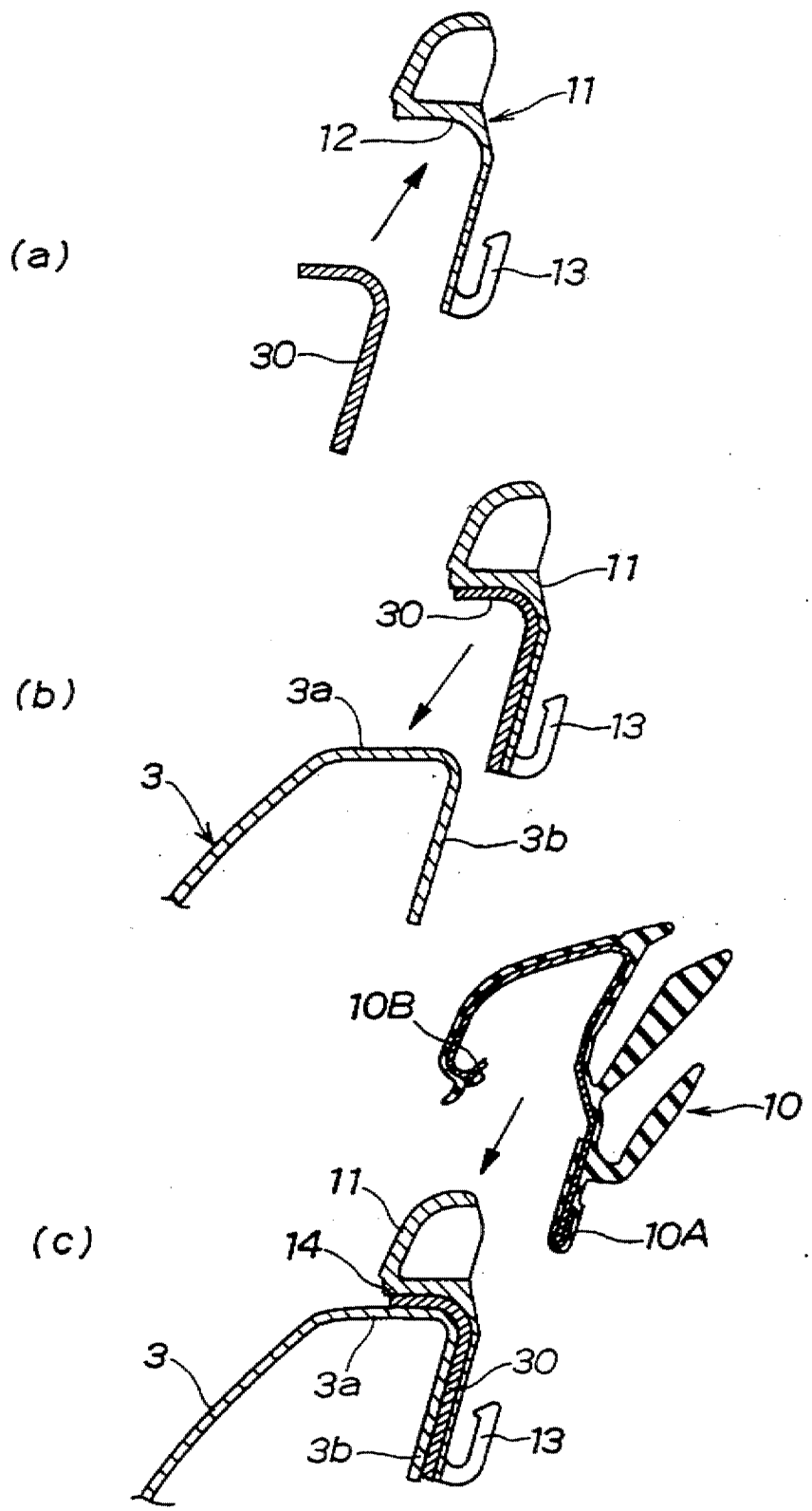
FIGS. 3(a) to c) show how the door-molding fitting structure is fitted on the vehicular door.
Figure 4:
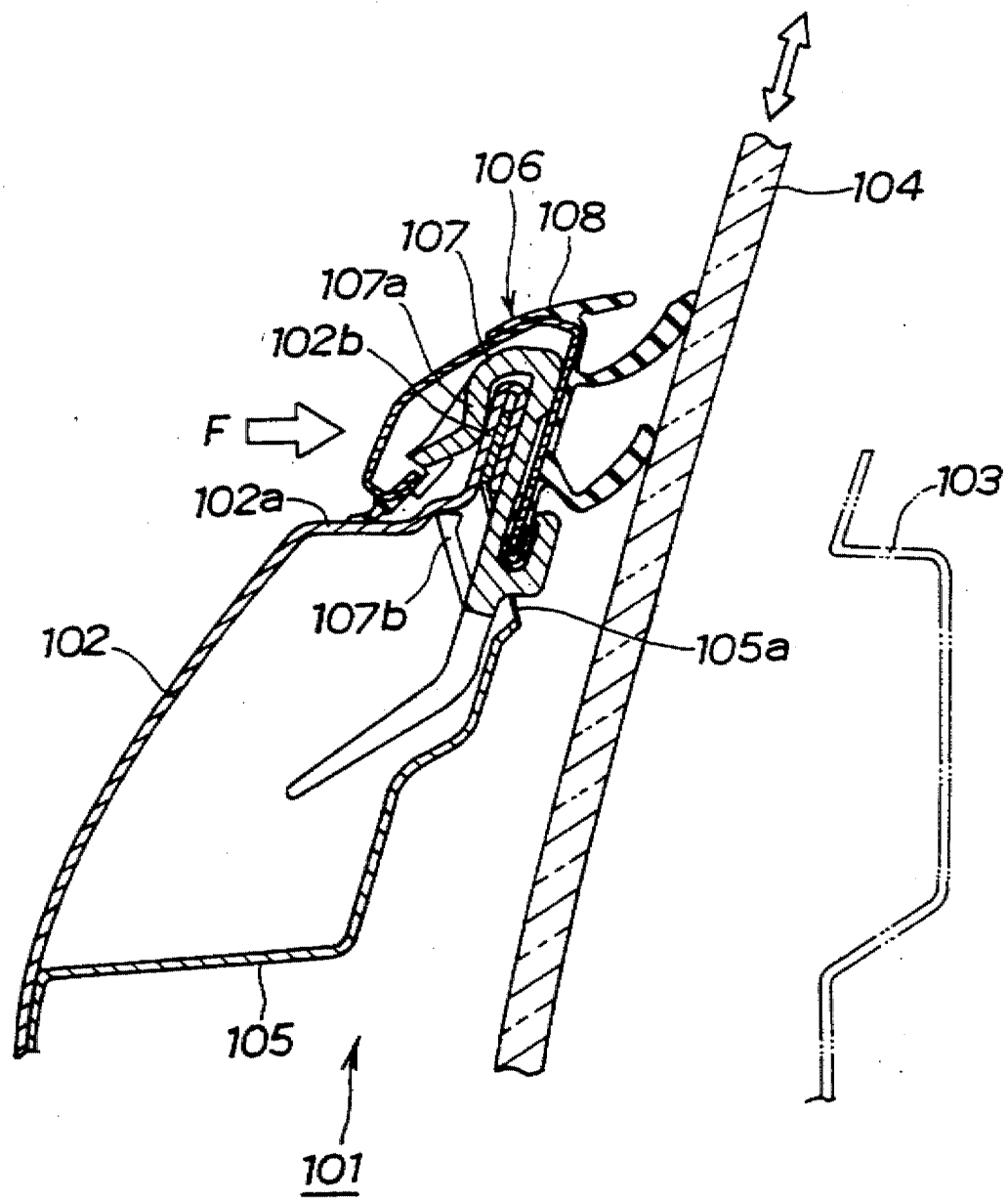
FIG. 4 is a cross sectional view of a conventional door-molding fitting structure.

Next, the fitting procedure of the aforementioned door molding 10 will be described based on FIG. 3.

FIGS. 3(a) to 3(c) show how the fitting structure of the door molding 10 according to the present invention is fitted. Initially, one surface of the thermosetting structural tape 30 is adhered to the contact surface portion 12 of the clip 11, as shown in FIG. 3(a).

Then, after the undercoating process of the coating of the vehicular door 1 is completed, the other surface of the thermosetting structural tape 30 is adhered to the horizontal portion 3a and the fall portion 3b of the door outer panel 3, as shown in FIG. 3(b).

Thereafter, in the intermediate coating process and finish coating process of the coating of the vehicular body (including the vehicular door 1), the thermosetting structural tape 30 is set by the heat (furnace temperature) that is given in performing the dry process of the coating in a baking and drying furnace. With this, the thermosetting structural tape 30 firmly bonds the door outer panel 3 and the clip 11 together.

Finally, the lower end portion 10A and the outer end portion 10B of the door molding 10 are fitted to the lower and upper hooks 13 and 14 of the clip 11 by means of snap fitting, and the fitting operation is completed as shown in FIG. 3(c).

Thus, the door molding 10 can be fitted on the upper end portion of the door outer panel 3 with simple operation. The thermosetting structural tape 30 is set by making use of, in particular, the furnace temperature produced when the dry process in the coating of the vehicular body is performed, and consequently, the operation becomes simple.

The aforementioned fitting procedure of the door molding 10 is merely an example for making the understanding of the structure according to this embodiment easier, and therefore the fitting procedure can be executed according to arbitrary procedure.

Next, the operation of the fitting structure of the aforementioned door molding 10 will be described based on FIG. 2.

The clip 11 is fitted on the two upper surfaces (horizontal portion 3a and fall portion 3b) of the door outer panel 3 by means of the thermosetting structural tape 30. Therefore, even if an external force acted in either up and down directions or right and left directions, the clip 11 could be held in its stable state without being moved in any direction. Thus, the door molding 10 can maintain the firm fitting state over a long period of time.

Figure 5:
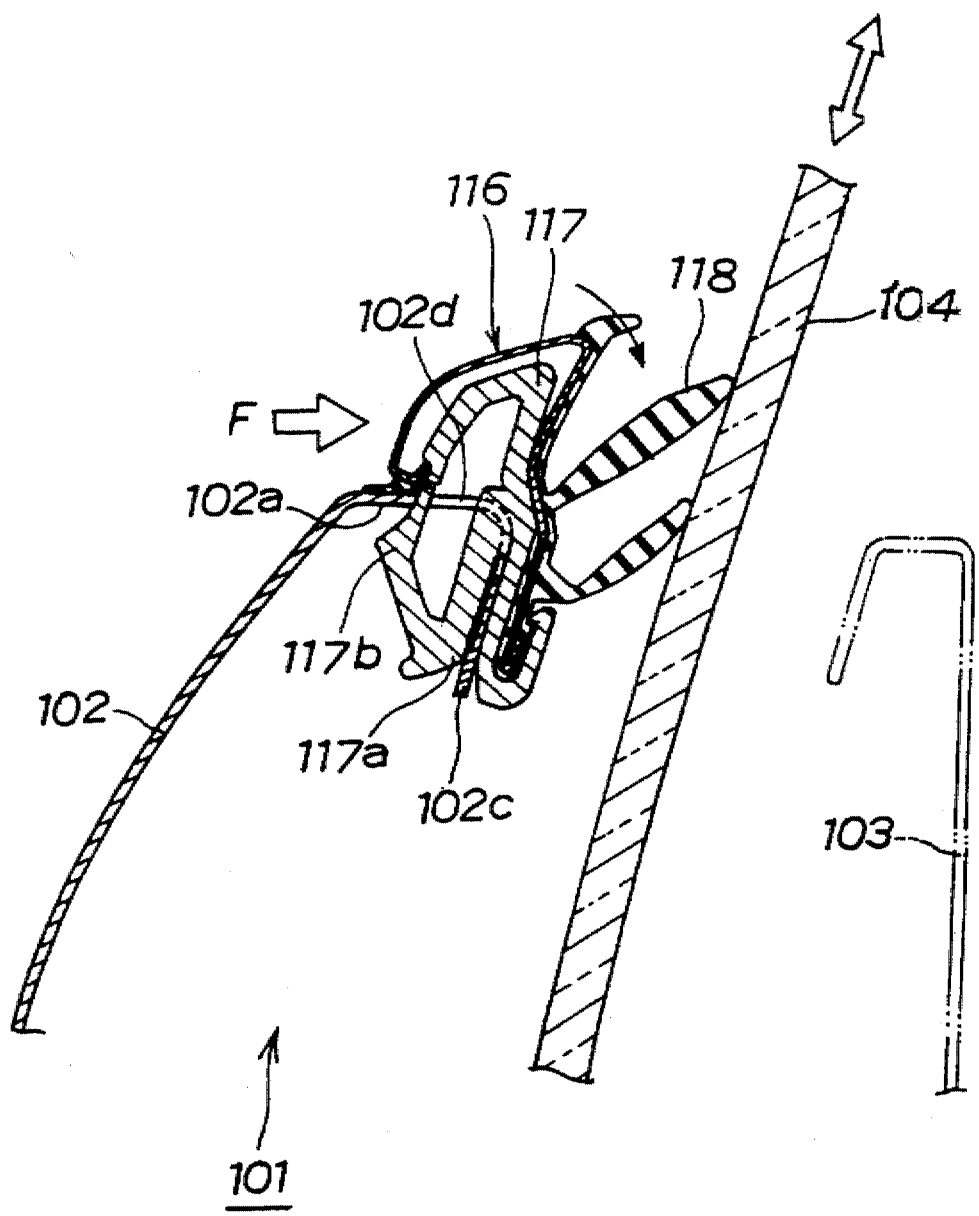
FIG. 5 is a cross sectional view of another conventional door-molding fitting structure.

In addition, unlike the prior art shown in FIG. 5, an insertion hole has not been formed in the corner portion between the horizontal portion 3a and the fall portion 3b of the door outer panel 3, and consequently, there is no possibility that shock lines resulting from a drilling process (phenomenon where line-shaped steps or projections occur due to the residual stresses produced at the time of formation) occur in the vicinity of the corner portion. Hence, the outer appearance in the vicinity of the corner portion is improved.

While the invention has been described with reference to a preferred embodiment thereof, it is to be understood that modifications or variations may be easily made without departing from the scope of this invention which is defined by the appended claims.

What is claimed is:

1. An improved vehicular door, comprising:

inner and outer door panels located adjacent to each other with a space therebetween for housing an extendable and retractable pane of window glass, said outer door panel including a curved portion extending upwardly, a horizontal portion and a fall portion, wherein said horizontal portion extends integrally from said curved portion towards said window glass pane and said fall portion extends integrally downwardly from said horizontal portion so that said fall portion has a surface approximately parallel with an outer surface of said window glass pane;

a door molding covering a gap between said fall portion and said window glass panel, wherein said door molding includes a molding member, a core member, and a clip member, said clip member having a contact surface with horizontal and vertical portions, with said vertical portion extending downwardly and a door molding fitting means, fitted on said contact surface portions of said clip member of said door molding, for firmly attaching said door molding to said horizontal portion and said fall portion of said outer door panel to maintain a firm fitting state over a long period of time even if an external force acts upon said door molding in any one of an up, down, left and right directions.

2. The improved vehicular door according to claim 1, wherein said door molding fitting means is a thermosetting structural adhesive material.

3. The improved vehicular door according to claim 2, wherein said thermosetting structural adhesive material comprises a thermosetting structural tape having long narrow rectangular upper and lower sticky surfaces.

4. The improved vehicular door according to claim 3, wherein said thermosetting structural adhesive material comprises a structural adhesive agent, defined as an adhesive agent with high reliability where a stress relatively near to a maximum rupture stress can be applied without rupture for a long period of time, wherein said structural adhesive agent is characterized as having a thermosetting property.

5. The improved vehicular door according to claim 3, wherein said thermosetting structural adhesive material comprises a semi-structural adhesive agent, defined as an intermediate between a structural adhesive agent and a non-structural adhesive resin characterized in that as temperature rises, creep occurs in an adhesive layer adhesive strength rapidly decreases and as temperature falls, rigidity increases until fragility appears, said semi-structural adhesive agent having a thermosetting property.

6. The improved vehicular door according to claim 3, wherein said molding member has an and said core member are an approximately inverted V-shaped and said molding member fits over said core member to form a molding of said door molding.

7. The improved vehicular door according to claim 3, wherein said molding member has an outer end portion and a lower end portion.

8. The improved vehicular door according to claim 3, wherein said clip member has lower hook and an upper hook.

9. The improved vehicular door according to claim 8, wherein an outer end portion of said molding member mates with said upper hook of said clip member and a lower end portion of said molding member mates with said lower hook of said clip member to fit said molding on said clip member.

10. The improved vehicular door according to claim 3, wherein said molding member includes inner lips for contact with said window glass pane.

11. The improved vehicular door according to claim 3, wherein an outer end of said molding member includes an outer lip for contact with said horizontal portion of said outer door panel to create a seal to protect said thermosetting structural tape from water and dirt.

12. The improved vehicular door according to claim 3, wherein said clip member further includes a reinforcement rib.

13. The improved vehicular door according to claim 2, wherein said thermosetting structural adhesive material comprises a structural adhesive agent, defined as an adhesive agent with high reliability where a stress relatively near to a maximum rupture stress can be applied without rupture for a long period of time, wherein said structural adhesive agent is characterized as having a thermosetting property.

14. The improved vehicular door according to claim 2, wherein said thermosetting structural adhesive material comprises a semi-structural adhesive agent, defined as an intermediate between a structural adhesive agent and a non-structural adhesive resin characterized in that as temperature rises, creep occurs in an adhesive layer adhesive strength rapidly decreases and as temperature falls, rigidity increases until fragility appears, said semi-structural adhesive agent having a thermosetting property.

15. An improved vehicular door, comprising:

inner and outer door panels located adjacent to each other with a space therebetween for housing an extendable and retractable pane of window glass, said outer door panel including a curved portion extending upwardly, a horizontal portion and a fall portion, wherein said horizontal portion extends integrally from said curved portion towards said window glass pane and said fall portion extends integrally downwardly from said horizontal portion so that said fall portion has a surface approximately parallel with an outer surface of said window glass pane;

a door molding covering a gap between said fall portion and said window glass pane, wherein said door molding includes a molding member, a core member, and a clip member, said clip member having a contact surface with horizontal and vertical portions, with said vertical portion extending downwardly; and a door molding fitting means, fitted on said contact surface portions of said clip member of said door molding, for temporarily attaching said contact surface of said clip member of said door molding to said horizontal portion and said fall portion of said outer door panel until said door molding fitting means is heated to set said door molding fitting means and thereby permanently bond said contact portion of said clip member of said door molding to said horizontal portion and said fall portion of said outer door panel of said vehicular door.

* * * * *